United States Patent
Clifford et al.

(10) Patent No.: US 8,504,785 B1
(45) Date of Patent: Aug. 6, 2013

(54) METHOD AND APPARATUS FOR BACKING UP TO TAPE DRIVES WITH MINIMUM WRITE SPEED

(75) Inventors: Thomas G. Clifford, Edina, MN (US); Donald C. Peterson, Eden Prairie, MN (US)

(73) Assignee: Symantec Corporation, Mountain View, CA (US)

( * ) Notice: Subject to any disclaimer, the term of this patent is extended or adjusted under 35 U.S.C. 154(b) by 566 days.

(21) Appl. No.: 12/401,535

(22) Filed: Mar. 10, 2009

(51) Int. Cl.
*G06F 12/16* (2006.01)

(52) U.S. Cl.
USPC ............. 711/162; 711/6; 711/161; 711/170

(58) Field of Classification Search
None
See application file for complete search history.

(56) References Cited

U.S. PATENT DOCUMENTS

| | | | | |
|---|---|---|---|---|
| 5,765,173 | A * | 6/1998 | Cane et al. | 707/999.101 |
| 6,268,975 | B1 * | 7/2001 | Bickers | 360/72.2 |
| 2003/0046490 | A1 * | 3/2003 | Busser et al. | 711/114 |
| 2008/0183642 | A1 * | 7/2008 | Akelbein et al. | 706/3 |
| 2009/0077300 | A1 * | 3/2009 | Forbis et al. | 711/4 |

OTHER PUBLICATIONS

Commvault, "A CommVault White Paper: CommVault Galaxy Backup & Recovery," CommVault Systems, Inc.; 2008; pp. 1-39.

* cited by examiner

*Primary Examiner* — Than Nguyen
(74) *Attorney, Agent, or Firm* — Wilmer Cutler Pickering Hale and Dorr LLP

(57) ABSTRACT

Techniques for controlling data backup operations are disclosed. In one particular exemplary embodiment, the techniques may be realized as a method for data backup. The method may include receiving a minimum write speed for a plurality of tape drives. The method may further include controlling data writes for the plurality of tape drives such that data may be attempted to be written to each tape drive at or above the minimum write speed for each tape drive.

15 Claims, 4 Drawing Sheets

| Tape Drive Name | Upper Native Speed (MB/sec) | Lower Native Speed (MB/sec) |
|---|---|---|
| Tape Drive$_1$ | 35 | 18 |
| Tape Drive$_2$ | 80 | 40 |
| Tape Drive$_3$ | 140 | 30 |

| Backup Server Name | Maximum Throughput (MB/sec) |
|---|---|
| Backup Server | 200 |

Figure 2

METHOD AND APPARATUS FOR BACKING UP TO TAPE DRIVES WITH MINIMUM WRITE SPEED

FIELD OF THE DISCLOSURE

The present disclosure relates generally to data backup processes and, more particularly, to techniques for controlling data backup operations.

BACKGROUND OF THE DISCLOSURE

Tape drives are used for computerized backup purposes. A tape drive contains a motor and a read/write head. The motor advances a tape installed in the tape drive across the read/write head. The motor may have a variable speed, so that the tape can be moved at a faster or slower speed across the read/write head. Generally, the slower a tape moves across the read/write head, the less data is read or written in a given time. The motor may have a lower limit speed, below which operation of the motor may damage the motor. The motor may also have an upper limit speed for the same reasons. The tape drive may thus have a lower limit on the amount of data that may be streamed to the tape drive to allow for proper operation of the tape drive. If data is streamed to the tape drive at a rate lower than the lower limit, the tape drive may stop the tape and store data in a memory buffer until the tape drive has enough data in the memory buffer to start the tape. The process of stopping the tape, filling the buffer, and rewinding and restarting the tape may take some amount of time, during which data is not written to the tape drive. The time may delay the end of a backup process, and create inefficiency. The upper and lower limits may differ from one brand and/or model of tape drive to another.

A backup server may be in communication with one or more tape drives. The backup server may use all or some of the tape drives simultaneously to create a backup of the backup server, or another client or clients in communication with the backup server. The backup server may stream data to each of the tape drives, but may not recognize the lower limits of the tape drives. The number of tape drives associated with the backup server, or activities associated with processing the data before it is transmitted to the tape drives, may decrease the available throughput. The backup server may thus fail to transfer enough data to meet the lower limits of one or more of the tape drives, and may create inefficiency in a tape drive backup environment as a result.

Problems with current tape drive backup environments may arise due to tape backup systems inadvertently creating inefficiencies in tape drive backup environments by failing to meet lower limits of one or more of the tape drives involved in the tape drive backup process. For example, rewinding and/or restarting a tape in a tape drive may cause a time delay, and may thus create unnecessary wear on the tape and the tape drive.

In view of the foregoing, it may be understood that there may be significant problems and shortcomings associated with current tape drive backup environments.

SUMMARY OF THE DISCLOSURE

Techniques for controlling data backup operations are disclosed. In one particular exemplary embodiment, the techniques may be realized as a method for data backup. The method may include receiving a minimum write speed for a plurality of tape drives. The method may further include controlling data writes for the plurality of tape drives such that data may be attempted to be written to each tape drive at or above the minimum write speed for each tape drive.

In accordance with other aspects of this particular exemplary embodiment, the method may further comprise monitoring data writes to each tape drive to determine if data has not been written to each tape drive at or above the minimum write speed for the tape drive.

In accordance with further aspects of this particular exemplary embodiment, the method may further comprise communicating a failure to maintain data transmission to any of the plurality of tape drives at or above the minimum write speed for the tape drive.

In accordance with additional aspects of this particular exemplary embodiment, the plurality of tape drives are may be assigned a priority.

In accordance with other aspects of this particular exemplary embodiment, the priority assigned to the one or more tape drives may be used to allocate throughput.

In accordance with further aspects of this particular exemplary embodiment, the method may further comprise encrypting the data before it is written to the plurality of tape drives.

In accordance with additional aspects of this particular exemplary embodiment, the method may further comprise compressing the data before it is written to the plurality of tape drives.

In accordance with other aspects of this particular exemplary embodiment, the method may further comprise creating an alert if data written to at least one of the plurality of tape drives falls below the minimum write speed for the at least one tape drive.

In accordance with further aspects of this particular exemplary embodiment, At least one processor readable medium for storing a computer program of instructions configured to be readable by at least one processor for instructing the at least one processor to execute a computer process for performing the method may be provided.

In another particular exemplary embodiment, the techniques may be realized as an apparatus for tape backup. The apparatus may comprise a module to receive a minimum write speed for a plurality of tape drives. The apparatus may further comprise a module to control data writes for the plurality of tape drives such that data is attempted to be written to each tape drive at or above the minimum write speed for each tape drive.

In accordance with other aspects of this particular exemplary embodiment, the apparatus may further comprise a module to monitor data writes to each tape drive to determine if data has not been written to each tape drive at or above the minimum write speed for the tape drive.

In accordance with further aspects of this particular exemplary embodiment, the apparatus may further comprise a module to communicate a failure to maintain data transmission to any of the plurality of tape drives at or above the minimum write speed for the tape drive.

In accordance with additional aspects of this particular exemplary embodiment, the plurality of tape drives may be assigned a priority.

In accordance with other aspects of this particular exemplary embodiment, the priority assigned to the one or more tape drives may be used to allocate throughput.

In accordance with further aspects of this particular exemplary embodiment, the apparatus may further comprise a module to encrypt the data before it is written to the plurality of tape drives.

In accordance with additional aspects of this particular exemplary embodiment, the apparatus may further comprise a module to compress the data before it is written to the plurality of tape drives.

In accordance with other aspects of this particular exemplary embodiment, the apparatus may further comprise a module to create an alert if data written to at least one of the plurality of tape drives falls below the minimum write speed for the at least one tape drive.

In another particular exemplary embodiment, the techniques may be realized as an article of manufacture for tape backup. The article of manufacture may comprise at least one processor readable medium, and instructions stored on the at least one medium, wherein the instructions are configured to be readable from the at least one medium by at least one processor and thereby cause the at least one processor to operate. The operation may be so as to receive a minimum write speed for a plurality of tape drives, and control data writes for the plurality of tape drives such that data is attempted to be written to each tape drive at or above the minimum write speed for each tape drive.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 2 shows data for exemplary tape drives and a tape drive server in accordance with an embodiment of the present disclosure.

DETAILED DESCRIPTION OF EXEMPLARY EMBODIMENTS

Figure 1:
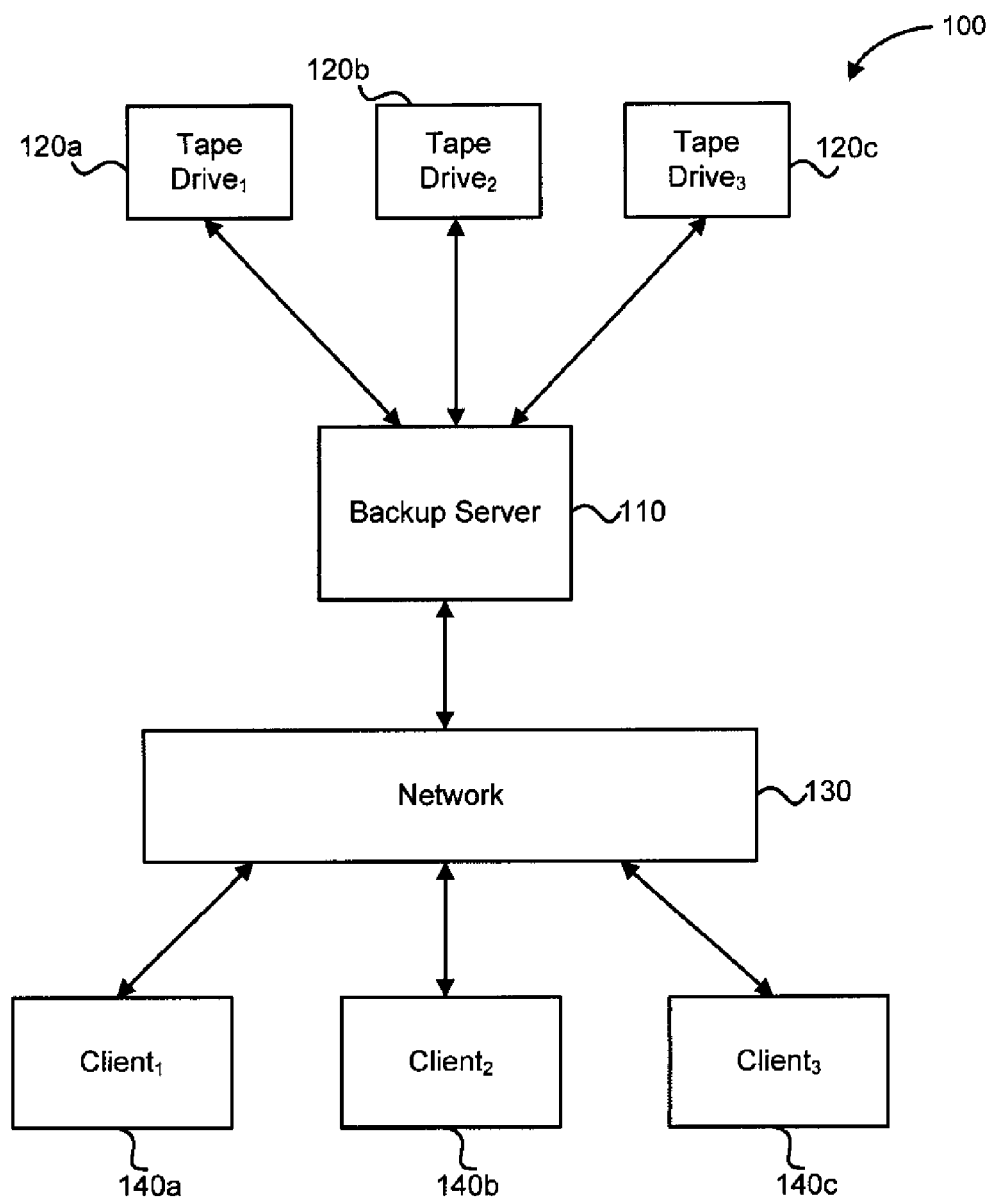
FIG. 1 shows a schematic view of a backup environment with a tape drive system and tape drives in accordance with an embodiment of the present disclosure.

Referring to FIG. 1, there is shown a schematic view of a backup environment with a tape backup system 100 comprising a backup server 110 and tape drives 120 in accordance with an embodiment of the present disclosure.

The tape drives (collectively 120, and shown in FIG. 1 as tape drive$_1$ 120$a$, tape drive$_2$ 120$b$, and tape drive$_3$ 120$c$) may be any kind of tape backup system known in the art. The tape drives 120 may be, for example and without limitation, Digital Audio Tape ("DAT") tape drives, Digital Data Storage ("DDS"), Quarter Inch Cartridge ("QIC") tape drives, or any other form of media involving a magnetic tape used to receive and store data. In addition, the tape drives 120 may encompass one or more optical drives. The tape drives 120 may be connected to the backup server 110 via a dedicated connection to the backup server 110, for example by one or more cables utilizing SCSI, ATA, Serial ATA, Parallel, Serial, Fibre Channel, FireWire, or other data transport mechanisms and/or protocols. The tape drives 120 may alternately be connected to the backup server 110 via one or more network connections or switches.

The tape drives 120 may receive data across the dedicated connection and/or the network connection, and may record the data on a removable tape. The tape drives 120 may contain or be associated with a buffer, so that data received from the backup server 110 may be stored in the buffer before it is written to the tape, or data read from a previously recorded tape may be stored in the buffer before it is transmitted to the backup server 110.

The tape drives 120 may utilize hardware and/or software to compress and/or encrypt data that is received from the backup server 110, or to decompress and/or decrypt data that is read from a previously recorded tape. The tape drives 120 may also receive commands from the backup server 110 to, for example, begin or end recording data to a tape, or to begin or end reading data from a tape. The tape drives 120 may also be operable to transmit data from a previously recorded tape to the backup server 110 or to another computer.

The tape drives 120 may record data to a tape at a certain data density. For example, the tape may record data at a rate of 10 megabytes per inch. The data density may be constant across the tape, or the data density may be variable. The tape drives 120 may utilize a motor to move a tape across a read/write head. The motor may have an upper speed limit and a lower speed limit. The upper and lower speed limits, along with the data density of the tape, may define the maximum and minimum recording rates of the tape drives 120. The tape drives 120 may have an upper limit for recording data. For example, the tape drives 120 may only be able to record at an upper rate of 80 megabytes per second. Beyond the upper limit, the tape drives 120 may not be able to record the data to the tape fast enough because, for example, it may not be able to move the tape past the tape read/write head fast enough.

The tape drives 120 may also have a lower limit for recording data. For example, the tape drives 120 may not receive enough data to be able to move the tape across the read/write head slow enough to still be faster than the lower speed limit of the motor. If the amount of data supplied to the tape drives 120 falls below the lower limit for recording data, the tape drives 120 may stop, and data may be transmitted to a buffer until enough data is stored so that the tape drives 120 may operate above the lower limit for recording data. The upper limit and the lower limit for the tape drives 120 may be communicated by the tape drives 120 to the backup server 110, or the upper limit and the lower limit may be stored in electronic form by the backup server 110 or another computer associated with the backup server 110. The upper limit and the lower limit of the tape drives 120 may also be supplied to the backup server 110 by an administrator.

The backup server 110 may be one or more computers used to control the tape drives 120. One or more of the tape drives 120 may be in communication with the backup server 110, and the backup server 110 may transmit commands to the tape drives 120 to, for example, begin recording data or stop recording data, or to read a previously recorded tape and transmit data to the backup server 110. The backup server 110 may utilize additional hardware or software to compress and/or or encrypt data before it is transmitted to the tape drives 120 or to decompress and/or decrypt data read from a previously recorded tape in one or more of the tape drives 120. The backup server 110 may have an upper throughput limit. The backup server 110 may communicate with one or more clients (collectively 140, and shown in FIG. 1 as client1 140a, client2 140b, and client3 140c) through a network 130 and may receive data from the clients 140 to write to one or more of the tape drives 120. Or, the backup server 110 may have data to write to one or more of the tape drives 120.

The backup server 110 may implement one or more policies resident on the backup server 110 or on another computer in communication with the backup server 110. The policies may indicate which clients 140 the backup server 110 is to collect data from for backup onto one or more of the tape drives 120, or when backups are to occur. The policies may also indicate a priority for backups, so that a particular client 140 should be backed up before another client 140. The policies may also indicate information about the tape drives 120. For example, the policies may indicate which of the tape drives 120 should be used to back up one or more of the clients 140.

The functionality of the backup server 110 may be implemented as, for example, a series of interoperable modules, such as a module to receive information regarding the number of tape drives 120 and receive information regarding the maximum and minimum write speeds of the tape drives 120 or to retrieve the information from, for example, an electronic file or memory address or addresses, a module to take data from one or more clients 140 and cause the data to be written to the tape drives 120, a module to monitor throughput of the backup server 110, and a module to report success or failure of the backup server 110 to an administrator or other software or hardware modules. In another embodiment, the functionality described may be implemented in hardware or as a single software process, instead of as interoperable modules.

The clients 140 may be physical devices commonly known in the art. For example, any of client1 140a, client2 140b, and client3 140c may be a computer that is implemented as one or more servers. Also, any of client1 140a, client2 140b, and client3 140c may be a computer that may receive data from one or more inputs, produce data through one or more outputs, have or interface with one or more persistent storage devices for storing and retrieving data, and/or be in communication with one or more networks. Further, any of client1 140a, client2 140b, and client3 140c may be a computer that may operate using an operating system, and may load the operating system into memory in local persistent storage such as, for example, a hard drive, or may load the operating system into memory in shared storage across one or more networks. Any of client1 140a, client2 140b, and client3 140c may also be, as further example and without limitation, a computer device such as a desktop computer, a laptop computer, a thin client computer, a personal digital assistant ("PDA"), or a cellular telephone with data storage capabilities. Any of client1 140a, client2 140b, and client3 140c may be architecturally different. For example, client1 140a, client2 140b, and client3 140c may use different software, for example different operating systems or different application software, and may also have different file systems. It should be understood that FIG. 1 is exemplary only, and that any number of clients may be used.

The network 130 may comprise the one or more networks referenced above, wherein each such network may include, but is not limited to, for example, a wide area network (WAN), a local area network (LAN), a fiber channel network or storage area network, an optical network, a SCSI or iSCSI network, a global network such as the Internet, a telephone network such as a public switch telephone network, a wireless communication network, a cellular network, an intranet, or the like, or any combination thereof. Also, each such network may be used so that components of the present disclosure may be in communication with one another. In exemplary embodiments of the present disclosure, the network 130 may include one or any number of the exemplary types of networks mentioned above operating as a stand-alone network or in cooperation with each other. Use of the term network 130 herein is not intended to limit the network 130 to a single network.

Referring to FIG. 2, exemplary data rates for the tape drives 120 and the backup server 110 are shown. The data rates shown in FIG. 2 are exemplary only, and reflect the tape drives 120 and the backup server 110 shown in FIG. 1. Of course, more or fewer tape drives 120, or more than one backup server 110, may be implemented. FIG. 2 reflects the three tape drives 120 attached to the backup server 110. Tape drive$_1$ 120a has an upper limit write speed of 35 megabytes per second, and a lower limit write speed of 18 megabytes per second. Tape drive$_2$ 120b has an upper limit write speed of 80 megabytes per second, and a lower limit write speed of 40 megabytes per second. Tape drive$_3$ 120c has an upper limit write speed of 140 megabytes per second, and a lower limit write speed of 30 megabytes per second. The upper limit write speeds and the lower limit write speeds may reference the native rate, so that, for example, compression of the data by the tape drives 120 may increase the rate at which data may be transferred to the tape drives 120. The backup server 110 has an average maximum throughput of 200 megabytes per second. In a backup operation that utilize tape drive$_1$ 120a, tape drive$_2$ 120b, and tape drive$_3$ 120c, the backup server 110 may balance the data going to each drive so that each of the tape drives 120 maintains at least the lower speed. In accordance with data rates presented in FIG. 2, the backup server 110 may attempt to sustain a throughput of 18 megabytes per second to tape drive$_1$ 120a, 40 megabytes per second to tape drive$_2$ 120b, and 30 megabytes per second to tape drive$_3$ 120c. Above the minimum requirements, extra available throughput from the backup server 110 may be allocated to the tape drives 120. The tape drives 120 may also be prioritized, so that during a backup operation, higher priority tape drives 120 receive more throughput than lower priority tape drives 120, or if the throughput of the backup server 110 can not maintain each tape drive 120 above its minimum write speed, throughput may be reallocated to ensure, if possible, that higher priority tape drives 120 receive throughput above their minimum write speed. If the tape drives 120 are prioritized, the allocation may occur according to priority, so that higher priority tape drives 120 receive throughput up to their maximum write speed, and lower priority tape drives 120 receive any throughput that is left over after the higher priority tape drives 120 receive data.

Figure 3:
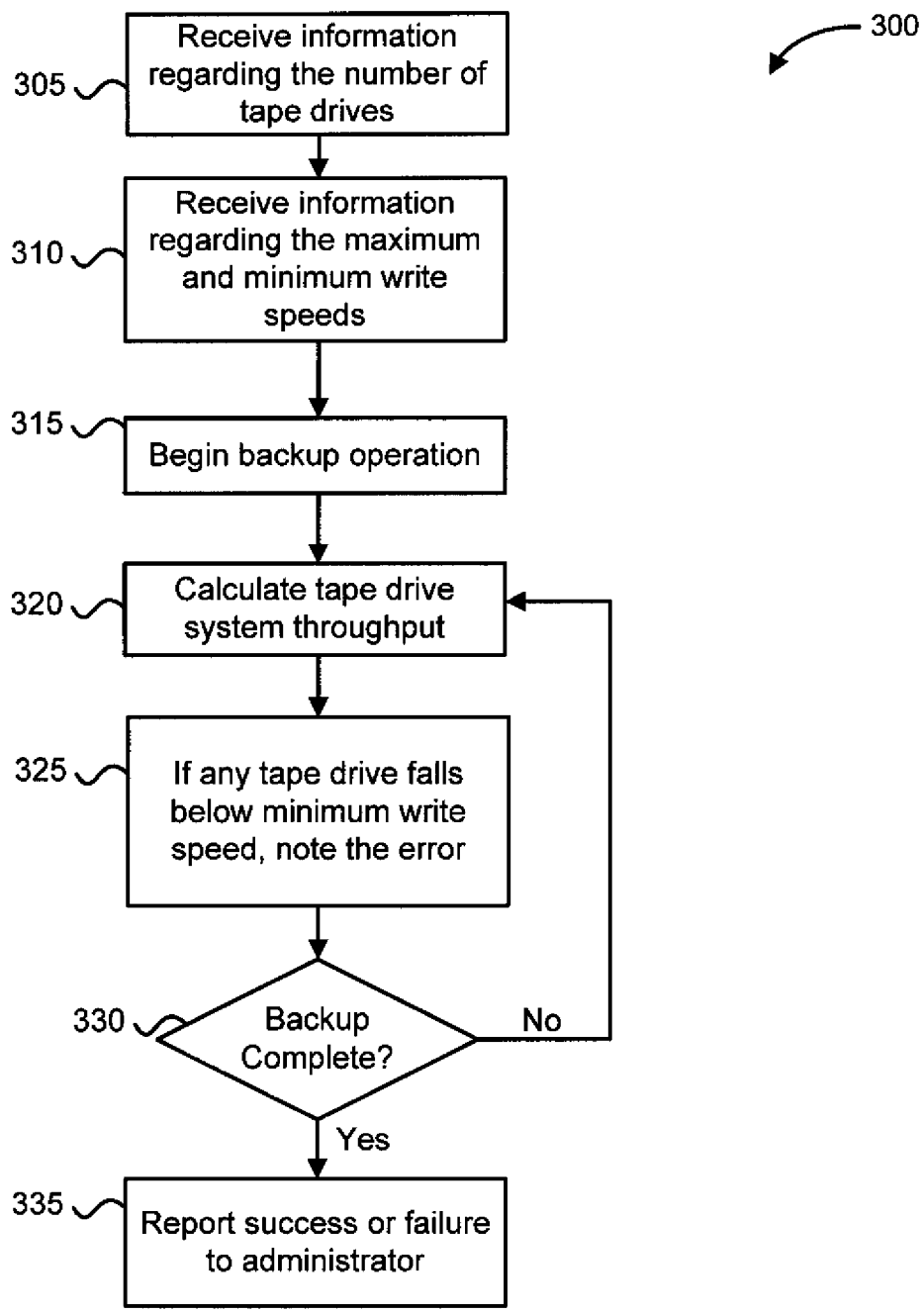
FIG. 3 shows a flow chart depicting a notification method in accordance with an embodiment of the present disclosure.

FIG. 3 shows a flow chart depicting a notification method 300 in accordance with an embodiment of the present disclosure.

In step 305, the backup server 110 may receive information regarding the number of tape drives 120 that are attached or in communication with the tape backup controller 110. The backup server 110 may have the information stored within the backup server 110, or the information may be supplied to the backup server 110.

In step 310, the backup server 110 may receive information regarding the maximum write speed and the minimum write speed of each of the tape drives 120. In both step 305 and step 310, the information may be provided by the tape drives 120 themselves, communicated over a link to the backup server 110, or the information may be entered into the backup server 110 via, for example, an electronic file or by a keyboard. The backup server 110 may store the information regarding the tape drives 120, so that the information does not need to be repeatedly transmitted to the backup server 110.

In step 315, a backup operation begins. The backup server 110 may send commands to the tape drives 120 to begin recording, and may then begin to send data to the tape drives 120. The backup server 110 may utilize one or more of the tape drives 120 simultaneously, or may record data to one or more of the tape drives 120 at a time.

In step 320, the backup server 110 may calculate throughput for the backup server 110 for some or all of the tape drives 120 in operation. The backup server 110 may monitor the throughput of links between the backup server 110 and the tape drives 120, for example, or the tape drives 120 may communicate throughput values to the backup server 110.

In step 325, if the throughput for any of the tape drives 120 falls below the specified minimum write speed, the backup server 110 notes and may communicate the failure. The backup server 110 may communicate the failure by, for example, transmitting an error message to one or more software or hardware modules associated with the backup server 110. In one embodiment, the backup server 110 may communicate the failure by alerting an administrator of the backup server 110 via, for example, an auditory warning, a graphical warning, a signal to an electronic pager or telephone, or an e-mail. Other types of warnings or alerts may also be used. The backup server 110 may wait until the end of the backup to alert the administrator or other software or hardware modules, or may send an alert for each failure, or may send an alert according to another schedule (e.g., only one alert during a backup, or an alert for every fifth failure, or an alert for a specific tape drive 120). The backup server 110 may also record the failure in a log file for analysis. The communication may identify the tape drive 120 that fell below the minimum write speed, the throughput speed when the failure occurred, and the number of times or the total time that the tape drive 120 failed to record at above the minimum write speed.

In step 330, the backup server 110 may continue to monitor the throughputs of the tape drives 120 throughout the backup operation. If the backup operation is not complete, the backup server 110 may return to step 320 and calculate the throughputs of the tape drives 120 again. The backup server 110 may continuously monitor the throughputs of the tape drives 120, or may measure the throughputs at defined or random time intervals.

If the backup operation is complete, the backup server 110 may report the success or failure of the backup operation and the throughput monitoring to an administrator or to another software or hardware module associated with the tape backup system 100 in step 335. The backup server 110 may also provide a report recommending steps that could be taken, such as configuration changes, the use of fewer tape drives, and the like, to allow the tape drives 120 to be more efficiently used during subsequent backups.

Figure 4:
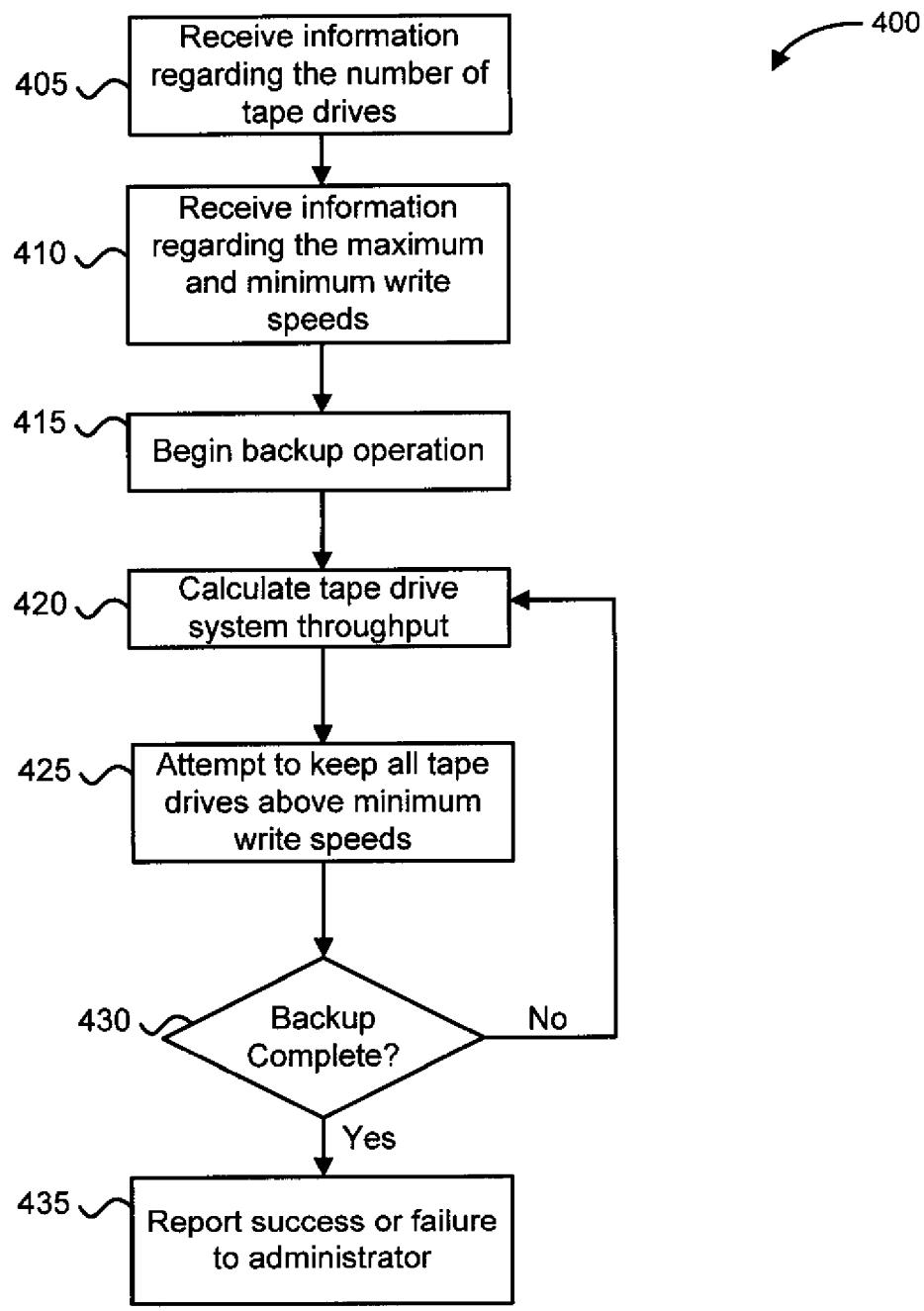
FIG. 4 shows a flow chart depicting an automatic balancing method in accordance with an embodiment of the present disclosure.

FIG. 4 shows a flow chart depicting an automatic balancing method 400 in accordance with an embodiment of the present disclosure. Steps 405, 410, 415, and 420 may proceed similarly to steps 305, 310, 315, and 320, respectively.

In step 425, the backup server 110 may attempt to allocate or reallocate throughput in order to keep all or substantially all of the tape drives 120 above their minimum write speeds. The backup server 110 may, for example, slow the throughput to one tape drive 120 and increase the throughput to another tape drive 120 so that both tape drives 120 are above their respective minimum write speeds. If the backup server 110 cannot allocate throughput so that each tape drive 120 in operation is above its minimum write speed, the backup server 110 may stop writing data to one or more of the tape drives 120 to increase throughput to the other tape drives 120. Or, the backup server 110 may allocate throughput so that a minimum number of drives are below their minimum write speeds. In allocating throughput, the tape drives 120 may be ordered so that, for example, if a throughput problem were realized, the backup server 110 may attempt to keep higher priority tape drives 120 writing data at the expense of other, lower priority, tape drives 120. Or, the priority in which tape drives 120 receive throughput from the backup server 110 may be random, or may be based on the minimum and/or maximum write speed of the tape drives 120, or may be based on other criteria. Priority of the tape drives 120 may be set by an administrator, or may be set by one or more policies operating on the backup server 110 or other computer.

In step 430, the backup server 110 may continue to monitor the throughputs of the tape drives 120 and the backup server 110 throughout the backup operation. If the backup operation is not complete, the backup server 110 may return to step 420 and calculate the throughputs to the tape drives 120 again. The backup server 110 may continuously monitor the throughputs to the tape drives 120, or may measure the throughputs at defined or random time intervals.

If the backup operation is complete, the backup server 110 may report the success or failure of the backup operation and the throughput monitoring to an administrator or to another software or hardware module associated with the tape backup system 100 in step 435.

At this point it should be noted that techniques for controlling data backup operations in accordance with the present disclosure as described above typically involve the processing of input data and the generation of output data to some extent. This input data processing and output data generation may be implemented in hardware or software. For example, specific electronic components may be employed in an electronic processor or similar or related circuitry for implementing the functions associated with controlling data backup operations in accordance with the present disclosure as described above. Alternatively, one or more processors operating in accordance with instructions may implement the functions associated with controlling data backup operations in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for data backup comprising:
    receiving a minimum write speed for a plurality of tape drives;
    assigning a priority to one or more of the plurality of tape drives;
    controlling data writes for the plurality of tape drives such that data is attempted to be written to each tape drive at or above the minimum write speed for each tape drive based at least in part on an assigned priority, wherein tape drives of the plurality of tape drives having a higher priority are assigned their respective maximum amount of throughput in order of priority and tape drives of the plurality of tape drives having a lower priority are assigned a remainder of throughput; and
    generating a report recommending configuration changes to improve data backup efficiency.

2. The method of claim 1, further comprising monitoring data writes to each tape drive to determine if data has not been written to each tape drive at or above the minimum write speed for the tape drive.

3. The method of claim 1, further comprising communicating a failure to maintain data transmission to any of the plurality of tape drives at or above the minimum write speed for the tape drive.

4. The method of claim 1, further comprising encrypting the data before it is written to the plurality of tape drives.

5. The method of claim 1, further comprising compressing the data before it is written to the plurality of tape drives.

6. The method of claim 1, further comprising creating an alert if data written to at least one of the plurality of tape drives falls below the minimum write speed for the at least one tape drive.

7. An apparatus for tape backup comprising:
    a module to receive a minimum write speed for a plurality of tape drives;
    a module to assign a priority to one or more of the plurality of tape drives;
    a module to control data writes for the plurality of tape drives such that data is attempted to be written to each tape drive at or above the minimum write speed for each tape drive based at least in part on an assigned priority, wherein tape drives of the plurality of tape drives having a higher priority are assigned their respective maximum amount of throughput in order of priority and tape drives of the plurality of tape drives having a lower priority are assigned a remainder of throughput and
    a module to generate a report recommending configuration changes to improve data backup efficiency.

8. The apparatus of claim 7, further comprising a module to monitor data writes to each tape drive to determine if data has not been written to each tape drive at or above the minimum write speed for the tape drive.

9. The apparatus of claim 7, further comprising a module to communicate a failure to maintain data transmission to any of the plurality of tape drives at or above the minimum write speed for the tape drive.

10. The apparatus of claim 9, wherein the failure to maintain data transmission to any of the plurality of tape drives at or above the minimum write speed for the tape drive is communicated to an administrator.

11. The apparatus of claim 7, where the priority assigned to the one or more of the plurality of tape drives is used to allocate throughput.

12. The apparatus of claim 7, further comprising a module to encrypt the data before it is written to the plurality of tape drives.

13. The apparatus of claim 7, further comprising a module to compress the data before it is written to the plurality of tape drives.

14. The apparatus of claim 7, further comprising a module to create an alert if data written to at least one of the plurality of tape drives falls below the minimum write speed for the at least one tape drive.

15. An article of manufacture for tape backup, the article of manufacture comprising:
    at least one processor readable medium; and
    instructions stored on the at least one medium;
    wherein the instructions are configured to be readable from the at least one medium by at least one processor and thereby cause the at least one processor to operate so as to:
        receive a minimum write speed for a plurality of tape drives;
        assign a priority to one or more of the plurality of tape drives;
        control data writes for the plurality of tape drives such that data is attempted to be written to each tape drive at or above the minimum write speed for each tape drive based at least in part on an assigned priority, wherein tape drives of the plurality of tape drives having a higher priority are assigned their respective maximum amount of throughput in order of priority and tape drives of the plurality of tape drives having a lower priority are assigned a remainder of throughput; and
        generate a report recommending configuration changes to improve data backup efficiency.

* * * * *